United States Patent
Kosaka et al.

(10) Patent No.: US 9,882,234 B2
(45) Date of Patent: Jan. 30, 2018

(54) METHOD FOR MANUFACTURING ALL-SOLID BATTERY

(71) Applicant: TOYOTA JIDOSHA KABUSHIKI KAISHA, Toyota-shi, Aichi-ken (JP)

(72) Inventors: Daichi Kosaka, Susono (JP); Norihiro Ose, Nagaizumi-cho (JP); Kengo Haga, Susono (JP); Tomoya Suzuki, Seto (JP); Hajime Hasegawa, Susono (JP); Keisuke Omori, Kariya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/178,250

(22) Filed: Jun. 9, 2016

(65) Prior Publication Data
US 2016/0380301 A1 Dec. 29, 2016

(30) Foreign Application Priority Data
Jun. 23, 2015 (JP) .................................. 2015-126049

(51) Int. Cl.
H01M 10/04 (2006.01)
H01M 10/0525 (2010.01)
H01M 10/0562 (2010.01)

(52) U.S. Cl.
CPC ....... *H01M 10/0468* (2013.01); *H01M 10/04* (2013.01); *H01M 10/0525* (2013.01); *H01M 10/0562* (2013.01); *H01M 2220/20* (2013.01); *Y02E 60/122* (2013.01)

(58) Field of Classification Search
CPC ......... H01M 10/0468; H01M 10/0562; H01M 10/0585; H01M 10/05825; B32B 37/02; B32B 37/10; B29C 66/929
See application file for complete search history.

(56) References Cited

U.S. PATENT DOCUMENTS

2013/0273438 A1* 10/2013 Yoshida .............. H01M 10/052
429/322

FOREIGN PATENT DOCUMENTS

| JP | 2014207104 A | * 10/2014 |
| JP | 2014-216131 A | 11/2014 |
| JP | 2015-008073 A | 1/2015 |

OTHER PUBLICATIONS

Machine translation of JP 2014207104 date unknown.*

* cited by examiner

*Primary Examiner* — John Goff
(74) *Attorney, Agent, or Firm* — Oliff PLC

(57) ABSTRACT

An all-solid battery having stacked therein, in order, a positive electrode laminate, an intermediate solid electrolyte layer, and a negative electrode laminate is manufactured by a first pressing step (i) of applying pressure to the positive electrode laminate, a second pressing step (ii) of applying pressure to the negative electrode laminate, and a third pressing step (iii) of applying pressure to the positive electrode laminate, the intermediate solid electrolyte layer, and the negative electrode laminate.

19 Claims, 3 Drawing Sheets

METHOD FOR MANUFACTURING ALL-SOLID BATTERY

TECHNICAL FIELD

The present invention relates to a method for manufacturing an all-solid battery. More specifically, the present invention relates to a method for manufacturing an all-solid battery in which a short circuit is suppressed and the internal resistance value is reduced.

BACKGROUND ART

In recent years, an all-solid battery where the electrolytic solution is replaced with a solid electrolyte is attracting attention. Compared with a secondary battery using an electrolytic solution, the all-solid battery using no electrolytic solution does not cause decomposition, etc., of the electrolytic solution attributable to overcharge and moreover, has high cycle durability and high energy density.

In such an all-solid battery, a positive electrode collector layer, a positive electrode active material layer, a solid electrolyte layer, a negative electrode active material layer, and a negative electrode collector layer are generally stacked in this order, and the manufacture of an all-solid battery generally includes pressing these layers as a whole for the purpose of improving the contact at a solid-solid interface to enhance the performance of the all-solid battery.

However, it is concerned that in such an all-solid battery, the positive electrode active material layer and the negative electrode active material layer may collapse due to deformation resulting from repeated charge/discharge cycles, vibration during use, etc., and thereby coming into contact with each other to cause a short circuit of the battery. As regards this issue, a technique of suppressing a short circuit of an all-solid battery by creating a difference between the area of the positive electrode active material layer and the area of the negative electrode active material layer is known. Please note that the size of a solid electrolyte layer is generally equal to or greater than the size of an active material layer having a large area.

There is a possibility that, when an all-solid battery having the above-described configuration is produced, a small-area active material layer bites into the above solid electrode layer by applying pressure to these layers as a whole, and thereby coming into contact with a large area active material layer to cause a short circuit of the battery.

The conventional manufacturing method of an all-solid battery is described by referring to FIG. 4. FIG. 4 is a view illustrating how a laminate 1 having stacked therein a positive electrode active material layer 2 of small area, a solid electrolyte layer 3 of large area, and a negative electrode active material layer 4 of large area is short-circuited when a pressure is applied to the laminate 1 in the manufacturing process of a conventional all-solid battery.

When a high pressure is applied to the laminate 1 so as to improve the contact between layers and/or in each layer and thereby enhance the performance of the all-solid battery (FIG. 4(a)), the positive electrode active material layer 2 of small area bites into the solid electrolyte layer 3 of large area (FIG. 4(b)), and at the same time, is put into contact with the negative electrode active material layer 4 of large area to cause a short circuit. Accordingly, studies have been made for a manufacturing method of an all-solid battery capable of suppressing such a short circuit.

The manufacturing method of an all-solid battery of Patent Document 1 includes applying pressure to (first pressing) a negative electrode laminate having a negative electrode active material layer and a first solid electrolyte layer and cutting the end part of the negative electrode laminate; applying pressure to (second pressing) a positive electrode laminate having a positive electrode active material layer and a second solid electrolyte layer and cutting the end part of the positive electrode laminate; obtaining a laminate for battery by stacking the negative electrode laminate and the positive electrode laminate such that the first solid electrolyte layer side and the second solid electrolyte layer side come into contact; and heat-pressing (third pressing) the laminate for battery. The manufacturing method of an all-solid battery of Patent Document 1 discloses a technique of changing the pressing pressure among respective steps, and the pressing pressure in each step is specifically as follows:

the pressing pressure in the first pressing step (i) is 500 MPa or more;

the pressing pressure in the second pressing step (ii) is 500 MPa or more; and the pressing pressure in the third pressing step (iii) is 100 MPa or more.

That is, in the manufacturing method of an all-solid battery of Patent Document 1, the pressing pressure in the third pressing step (iii) is set to be smaller than the pressing pressure in the first pressing step (i) and the pressing pressure in the second pressing step (ii), and thereby preventing that one active material layer bites into another active material layer.

The manufacturing method of an all-solid battery of Patent Document 2 includes pressing a positive electrode layer and a first crystal electrolyte layer to obtain a positive electrode laminate; applying pressure to a negative electrode layer and a second crystal electrolyte layer to obtain a negative electrode laminate; and applying pressure to the positive electrode laminate and the negative electrode laminate in the state of a glass electrolyte layer being sandwiched therebetween. Patent Document 2 discloses a technique of enhancing the interlayer adherence between the positive electrode laminate and the negative electrode laminate by applying pressure to the laminates in the state of a glass electrolyte layer being sandwiched therebetween.

RELATED ART

Patent Document

[Patent Document 1] Japanese Unexamined Patent Publication No. 2015-008073

[Patent Document 2] Japanese Unexamined Patent Publication No. 2014-216131

SUMMARY OF THE INVENTION

Problems to be Solved by the Invention

The present inventors have found that when the laminate for battery of the all-solid battery manufactured by the method of Patent Document 1 is heat-pressed (third pressing step (iii)), the internal resistance value of the all-solid battery having the laminate for battery is increased, because of a plurality of factors such as production of a battery capacity-reducing substance(s) and change in quality of the solid electrolyte inside the negative electrode laminate and/or the positive electrode laminate.

Accordingly, an object of the present invention is to provide a method for manufacturing an all-solid battery in which a short circuit is suppressed and the internal resistance value is reduced.

Means to Solve the Problems

The present inventors have found the above-described object can be attained by the following features.

<1> A method for manufacturing an all-solid battery having stacked therein, in order, a positive electrode laminate, an intermediate solid electrolyte layer, and a negative electrode laminate, including:
  (i) applying pressure to the positive electrode laminate,
  (ii) applying pressure to the negative electrode laminate, and
  (iii) applying pressure to the positive electrode laminate, the intermediate solid electrolyte layer, and the negative electrode laminate, wherein:
  the pressing pressure of the above step (i) is higher than the pressing pressure of the above step (iii), and the pressing temperature of the above step (i) is from 150 to 175° C.;
  the pressing pressure of the above step (ii) is higher than the pressing pressure of the above step (iii), and the pressing temperature of the above step (ii) is 125° C. or less;
  the pressing temperature of the above step (iii) is 125° C. or less;
  the positive electrode laminate has a positive electrode collector layer and a positive electrode active material layer in this order or has a positive electrode collector layer, a positive electrode active material layer, and a first solid electrolyte layer in this order;
  the negative electrode laminate has a negative electrode active material layer and a copper-containing negative electrode collector layer in this order or has a second solid electrolyte layer, a negative electrode active material layer, and a copper-containing negative electrode collector layer in this order;
  at least one of the first solid electrolyte layer and the second solid electrolyte layer is present; and
  the intermediate solid electrolyte layer before the pressing in the above step (iii) is not pressed at a pressure exceeding the pressing pressure of the above step (iii).

<2> The method according to item <1>, wherein the pressing pressure of the above step (i) is 710 MPa or more.

<3> The method according to item <1> or <2>, wherein the pressing pressure of the above step (ii) is 630 MPa or more.

<4> The method according to any one of items <1> to <3>, wherein the pressing pressure of the above step (iii) is 200 MPa or less.

<5> The method according to any one of items <1> to <4>, wherein the area of the positive electrode laminate is smaller or larger than the area of the negative electrode laminate.

<6> The method according to any one of items <1> to <5>, wherein:
  the first solid electrolyte layer and/or the second solid electrolyte layer contain a sulfide-based crystalline solid electrolyte; and
  the intermediate solid electrolyte layer contains a sulfide-based amorphous solid electrolyte.

<7> The method according to any one of items <1> to <6>, wherein the positive electrode collector layer contains aluminum.

<8> An automobile, equipped with an all-solid battery manufactured by the method according to any one of items <1> to <7>.

Effects of the Invention

According to the present invention, a method for manufacturing an all-solid battery in which a short circuit is suppressed and the internal resistance value is reduced, can be provided.

DETAILED DESCRIPTION OF THE PRESENT INVENTION

Figure 1:
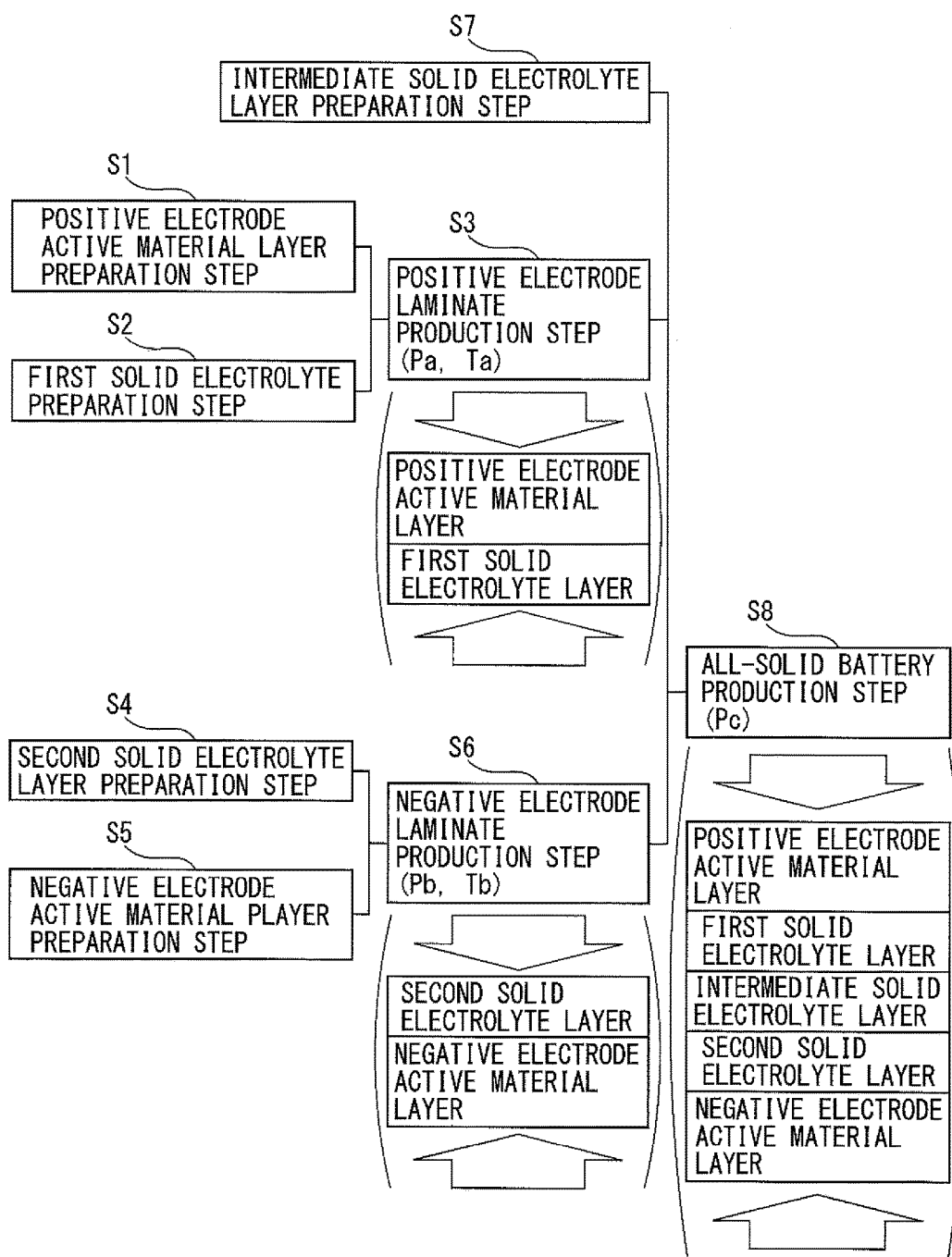
FIG. 1 is a flowchart illustrating one embodiment of the method for manufacturing an all-solid battery of the present invention.

Embodiments of the present invention is described in detail below. The present invention is not limited to the following embodiments and can be carried out by making various modifications within the gist of the present invention. In the drawings, the dimensional ratio is changed for the convenience of explanation and may be different from the actual ratio. Furthermore, in the description of drawings, like elements are denoted by like numerals, and redundant explanation thereof is omitted.

<<All-Solid Battery>>
<Pressing Step>

In the method of the present invention, an all-solid battery having stacked therein, in order, a positive electrode laminate, an intermediate solid electrolyte layer, and a negative electrode laminate is manufactured. The method of the present invention includes a first pressing step (i) of applying pressure to the positive electrode laminate, a second pressing step (ii) of applying pressure to the negative electrode laminate, and a third pressing step (iii) of applying pressure to the positive electrode laminate, the intermediate solid electrolyte layer, and the negative electrode laminate. Furthermore, in the method of the present invention, the pressing pressure of the first pressing step (i) is higher than the pressing pressure of the third pressing step (iii) and the pressing temperature of the first pressing step (i) is from 150 to 175° C.; and the pressing pressure of the second pressing step (ii) is higher than the pressing pressure of the third pressing step (iii) and the pressing temperature of the second pressing step (ii) is 125° C. or less.

In the method of the present invention for manufacturing an all-solid battery, the pressing pressure of the third pressing step (iii) is set to be lower than the pressing pressure of the first pressing step (i) and the pressing pressure of the second pressing step (ii), whereby one laminate is prevented from biting into another laminate in the manufacturing process of a battery, while suppressing occurrence of a short circuit, and the internal resistance in the positive electrode laminate and the negative electrode laminate is reduced due to the relatively large first (i) and second (ii) pressing pressures.

In addition, as the problem in the case of using such pressing pressures, the present inventors have found the following problems (1) to (4):

(1) Production of Reaction Product of Copper a problem that under the high-temperature condition, a reaction product such as copper sulfide leading to reduction in the capacity of an all-solid battery is readily produced between the copper-containing collector layer and an active material layer, in particular, an active material layer containing a sulfide-based solid electrolyte;

(2) Difficulty in Reducing Resistance Value of Positive Electrode Active Material Layer a problem that in the step of applying pressure to a conventional positive electrode laminate, in particular, a positive electrode active material layer, the resistance value of the positive electrode active material layer can be hardly reduced;

(3) Deterioration of Bonding and/or Adhesion Between Positive Electrode Laminate and Negative Electrode Laminate a problem that when the positive electrode laminate and/or the negative electrode laminate are pressed under high-pressure and high-temperature conditions, the bonding and/or adhesion between the positive electrode laminate and the negative electrode laminate are reduced and a separation is likely to occur therebetween; and (4) Increase in Resistance Value of Solid Electrolyte Layer Due to Reduction in Filling Factor of Solid Electrolyte Layer a problem that the resistance value of the solid electrolyte layer increases due to a decrease in the filling factor of the all-solid battery, in particular, the solid electrolyte layer inside thereof.

Re: Problem (1)

Without being bound by any theory, the production of a reaction product such as copper sulfide in (1) above is believed to be due to the fact that in a high-power all-solid battery, in view of high chemical stability, etc., copper can be employed as a raw material of the collector, e.g., negative electrode collector. However, there is a possibility that under a high temperature, in particular, more than 125° C., a solid electrolyte, in particular, a sulfide-based solid electrolyte, contained in the negative electrode active material layer is likely to react with copper to produce a reaction product such as copper sulfide. It is believed that the reaction product such as copper sulfide takes in ion species, in particular, lithium ion, during charging but, on the other hand, does not release it at the time of discharging, as a result, the capacity of the all-solid battery is reduced.

As regards this issue, in the method of the present invention for manufacturing an all-solid battery, the pressing temperature of the second pressing step (ii) is 125° C. or less.

Therefore, a reaction product such as copper sulfide can be prevented from being produced between the copper-containing negative electrode collector layer and the solid electrolyte-containing negative electrode active material layer. In an all-solid content where production of a reaction product such as copper sulfide is prevented, reduction in the capacity thereof can be suppressed.

The pressing pressure of the second pressing step (ii) includes a pressure of 600 MPa or more, and 630 MPa or more. When this pressing pressure is sufficiently large, the filling factor of the negative electrode laminate can be increased.

The pressing temperature of the second pressing step (ii) includes a temperature of 125° or less, 120° C. or less, 110° C. or less, and 100° C. or less. When this pressing temperature is sufficiently low, the production, etc., of a substance causing a reduction in the battery capacity can be suppressed.

Re: Problem (2)

Without being bound by any theory, the difficulty in reducing the resistance value of the positive electrode active material of (2) above is believed to be due to the fact that by the following (2-A) and (2-3).

(2-A) State of Solid Electrolyte

The positive electrode active material preferably contains a solid electrolyte, in particular, amorphous and/or crystalline solid electrolytes. The amorphous and/or crystalline solid electrolyte particles are relatively hard under low temperature, in particular, less than 150° C. When the relatively hard solid electrolyte particle is pressed (irrespective of whether low pressure or high pressure), it is difficult to enhance the contact property and/or the contact area, etc., between these solid electrolyte particles and/or between the solid electrolyte particle and the positive electrode active material particle.

(2-B) Production of Low Lithium Ion Conductive Layer

The positive electrode active material layer preferably contains a solid electrolyte, in particular, a sulfide-based solid electrolyte. This solid electrolyte, in particular, the sulfide-based solid electrolyte, readily undergoes a change in the crystal structure under high temperature, in particular, more than 175° C. A low lithium ion conductive layer is produced by the change in the crystal structure, and the conductive layer brings about a reduction in the lithium ion conductivity.

The "crystalline solid electrolyte" as used in the present invention means a material obtained by crystallizing an amorphous solid electrode by a treatment such as heating. The judgment of crystalline or amorphous can be performed, for example, using an X-ray diffraction method. The ion conductivity of a crystalline solid electrolyte is higher than, for example, the ion conductivity of an amorphous solid electrolyte, so that in an all-solid battery employing a crystalline solid electrolyte, the internal resistance value can be reduced.

As regards this issue, in the method of the present invention for manufacturing an all-solid battery, the pressing temperature of the first pressing step (i) of applying pressure to the positive electrode laminate is from 150 to 175° C., and the pressing pressure of the first pressing step (i) is higher than the pressing pressure of the third pressing step (iii).

More specifically, since the pressing temperature of the first pressing step (i) is 150° C. or more, the amorphous and/or crystalline solid electrolyte particles can be made relatively soft. Furthermore, the pressing pressure of the first pressing step (i) is relatively high. Accordingly, the contact property and/or the contact area between these solid electrolyte particles and/or between the solid electrolyte particle and the positive electrode active material particle are enhanced, and the filling factor of the positive electrode laminate, in particular, the positive electrode active material layer, is increased. As a result, reduction in the resistance value of the positive electrode laminate, in particular, the positive electrode active material layer, can be realized.

In addition, since the pressing temperature of the first pressing step (i) is 175° C. or less, the solid electrolyte, in particular, the sulfide-based solid electrolyte, does not substantially cause a change in the crystal structure, which may lead to production of a low lithium ion conductive layer. As a result, reduction in the resistance value of the positive electrode active material layer can be realized.

The pressing pressure of the first pressing step (i) includes a pressure of 600 MPa or more, and 710 MPa or more. When this pressing pressure is sufficiently large, the filling factor of the positive electrode laminate, in particular, the positive electrode active material layer, can be increased.

The pressing temperature of the first pressing step (i) includes a temperature of 150° C. or more, 155° C. or more, and 160° C. or more. In addition, this pressing temperature includes a temperature of 175° C. or less, 170° C. or less, and 165° C. or less.

Re: Problem (3)

Without being bound by any theory, the deterioration of bonding and/or adhesion between positive electrode laminate and negative electrode laminate of (3) above is believed to be due to the fact that for the following reason. That is, under high temperature, for example, 100° C. or more, in particular, 150° C. or more, a solid electrolyte, in particular, amorphous and/or crystalline solid electrolyte, becomes relatively soft. Therefore, when a layer containing this solid electrolyte is pressed under the above-described temperature condition, the surface of the layer, i.e., the contact surface between the layer and a pressing face, is smoothed. The smooth surface of the layer pressed at a high temperature is smoother than the surface of a layer that is pressed at the same pressure as above other than ordinary temperature. For this reason, it is believed that when the positive electrode laminate and/or the negative electrode laminate are previously pressed at a high temperature, the bonding and/or adhesion between the positive electrode laminate and the negative electrode laminate may be deteriorated.

Without being bound by any theory, it is believed that one of the reasons why a layer having a smooth surface causes a reduction in the bonding and/or adhesion, is an anchor effect. The anchor effect as used in the present invention means an effect of creating a geometrically complex interface between two different physical objects and thereby fixing these physical objects. In general, a correlation may be present between the interface roughness and the anchor effect. It is believed that on the above-described smooth surface, the interface roughness is low and an anchor effect is less likely to be produced, as a result, the bonding and/or adhesion are reduced.

As regards this issue, in the method of the present invention for manufacturing an all-solid battery, the intermediate solid electrolyte before the pressing in the third pressing step (iii) is not pressed at a pressure equal to or greater than the pressing pressure of the third pressing step (iii).

Therefore, the intermediate solid electrolyte layer is not in a compressed state, for example, a state of a powder being compacted under a high pressure, but in a non-compressed state. In the case where the intermediate solid electrolyte layer is in this non-compressed state, the bonding and/or adhesion between the positive electrode laminate having a relatively smooth surface and the intermediate solid electrolyte layer are enhanced under the conditions of an ordinary temperature and a relatively low pressure (third pressing step (iii)). Furthermore, the effect above can also be exerted between the negative electrode laminate and the intermediate solid electrolyte layer. This is believed to be achieved because the intermediate solid electrolyte layer is in a non-compressed state, whereby the anchor effect above is readily produced. Accordingly, the bonding and/or adhesion between the positive electrode laminate and the negative electrode laminate can be enhanced by the presence of an intermediate solid electrolyte layer in a non-compressed state.

The pressing pressure of the third pressing step (iii) includes a pressure of 200 MPa or less, and 100 MPa or less. When this pressing pressure is sufficiently low, at the time of manufacture of an all-solid battery, a short circuit thereof can be suppressed.

The pressing pressure of the third pressing step (iii) includes a pressure of more than 0 MPa, 40 MPa or more, and 100 MPa or more. When this pressing pressure is sufficiently high, the filling factor of the intermediate solid electrolyte layer can be maintained at not less than a predetermined value.

The pressing temperature of the third pressing step (iii) is not particularly limited as long as it is 125° C. or less.

Re: Problem (4)

The increase in the resistance value of the solid electrolyte layer accompanying the reduction in the filling factor of the solid electrolyte layer of (4) above is attributed to the deterioration of the solid-solid interfacial contact between particles in the layer. More specifically, a high correlation may be present between the filling factor of a certain layer and the resistance value of the layer. Therefore, in the case where the filling factor of a certain layer is relatively high, since the solid-solid interfacial contact is increased, the resistance value of the layer becomes relatively low, and vice versa.

For this reason, in the method of the present invention employing a third pressing step (iii) of applying pressure to the intermediate solid electrolyte layer at a relatively low pressure, there is a possibility that the filling factor of the intermediate solid electrolyte is relatively low, leading to increase in the resistance value of the intermediate solid electrolyte layer.

The "filling factor" as used in the present invention means a ratio of the volume of all substances in a certain physical object to the apparent volume of the physical object. For example, the filling factor of the positive electrode active material layer means a ratio of the volume of all substances constituting the positive electrode active material layer to the apparent volume of the positive electrode active material layer.

Incidentally, note that the internal resistance value of an all-solid battery is mainly composed of the resistance value of the positive electrode active material layer, the resistance value of the negative electrode active material layer, and the resistance value of the solid electrolyte layer. The present inventors have found that with respect to the details of the internal resistance value of the all-solid battery, the resistance value of the positive electrode active material layer is the largest value and the resistance value of the solid electrolyte layer is the smallest value.

Accordingly, When considering the relationship between the resistance value of each of the layers above and the internal resistance value of the all-solid battery and the relationship between the filling factor and the resistance value of the layer above, even if the resistance value of the intermediate solid electrolyte layer is increased, the effect of the resistance value of the internal solid electrolyte layer on the internal resistance value of the all-solid battery can be kept to a minimum.

Furthermore, in the method of the present invention for manufacturing an all-solid battery, as described above, the resistance value of the positive electrode laminate, in particular, the positive electrode active material layer, is reduced by the first pressing step (i). Accordingly, it should be understood that when considering a very large effect of the reduction in the resistance value of the positive electrode active material layer on the internal resistance value of the all-solid battery, the effect of the resistance value of the intermediate solid electrolyte layer on the internal resistance value of the all-solid battery poses almost no problem.

<Positive Electrode Laminate and Negative Electrode Laminate>

In the method of the present invention for manufacturing an all-solid battery, the positive electrode laminate has a positive electrode collector layer and a positive electrode active material layer in this order or has a positive electrode collector layer, a positive electrode active material layer, and a first solid electrolyte layer in this order; and the negative electrode laminate has a negative electrode active material layer and a copper-containing negative electrode collector layer in this order or has a second solid electrolyte layer, a negative electrode active material layer, and a copper-containing negative electrode collector layer in this order. In addition, in the method of the present invention, at least one of the first solid electrolyte layer and the second solid electrolyte layer is present.

More specifically, in the method of the present invention for manufacturing an all-solid battery, at least one of the positive electrode laminate and the negative electrode laminate contains a solid electrolyte layer, and the active material layer and the solid electrolyte layer are integrally compression-formed by the first pressing step (i) and/or the second pressing step (ii). As a result, the solid-solid interfacial contact of the active material layer and the solid electrolyte layer is enhanced, and the internal resistance value of the all-solid battery can be reduced.

In the method of the present invention for manufacturing an all-solid battery, the area of the positive electrode laminate is preferably smaller or larger than the area of the negative electrode laminate.

By creating a difference between the area of the positive electrode laminate and the area of the negative electrode laminate, the positive electrode active material layer and the negative electrode active material layer can be prevented from collapsing and coming into contact with each other to cause a short circuit of the battery.

Incidentally, in the case of charging an all-solid battery, generally, ion species, for example, lithium ion, moves to the negative electrode active material layer from the positive electrode active material layer, and the ion is reduced to a metal and incorporated into the negative electrode active material layer (intercalation). If the area of the negative electrode active material layer is smaller than the area of the positive electrode active material layer or these areas are substantially the same, the metal not incorporated into the negative electrode active material layer may deposit in the form of a dendrite, etc., giving rise to a short circuit.

Regarding this issue, in the method of the present invention for manufacturing an all-solid battery, it is more preferred that the area of the positive electrode laminate is smaller than the area of the negative electrode laminate.

Due to this configuration, generation of the above-described dendrite, etc., can be suppressed.

In the method of the present invention, preferably, the first solid electrolyte layer and/or the second solid electrolyte layer contain a sulfide-based crystalline solid electrolyte, and the intermediate solid electrolyte layer contains a sulfide-based amorphous solid electrolyte.

The crystalline solid electrolyte has a high ion conductivity. Therefore, the resistance value of a layer containing the crystalline solid electrolyte can be decreased.

Furthermore, the amorphous solid electrolyte particle is relatively soft. Therefore, in the solid electrolyte layer containing the amorphous solid electrolyte, the bonding and/or adhesion to other layer in contact with this layer are enhanced by the anchor effect, etc., and separation between these layers can be suppressed.

One Embodiment of Manufacturing Method of All-Solid Battery of the Present Invention One embodiment of the manufacturing method of an all-solid battery of the present invention is described by referring to FIG. 1. FIG. 1 is a flowchart illustrating one embodiment of the method for manufacturing an all-solid battery of the present invention.

The method for manufacturing an all-solid battery of the present invention in this embodiment includes the following steps:

positive electrode active material layer preparation step (S1), first solid electrolyte layer preparation step (S2), and positive electrode laminate production step (S3);

second solid electrolyte layer preparation step (S4), negative electrode active material layer preparation step (S5), and negative electrode laminate production step (S6); and intermediate solid electrolyte layer preparation step (S7), and all-solid battery production step (S8).

The order of positive electrode active material layer preparation step (S1) and first solid electrolyte layer preparation step (S2) is not particularly limited as long as these steps are conducted before positive electrode laminate production step (S3). The order of second solid electrolyte layer preparation step (S4) and negative electrode active material layer preparation step (S5) is not particularly limited as long as these steps are conducted before negative electrode laminate production step (S6). The order of positive electrode laminate production step (S3), negative electrode laminate production step (S6), and intermediate solid electrolyte layer preparation step (S7) is not particularly limited as long as these steps are conducted before all-solid battery production step (S8).

The positive electrode active material layer preparation step (S1) is a step of preparing a positive electrode active material layer. This step is not particularly limited as long as it is a step of preparing a positive electrode active material layer for use in an all-solid battery. For example, the positive electrode active material layer can be prepared by drying/calcining a positive electrode active material slurry layer. For example, the positive electrode active material slurry layer can be formed by applying a positive electrode active material slurry.

The first solid electrolyte layer preparation step (S2) is a step of preparing a first solid electrolyte layer. This step is not particularly limited as long as it is a step of preparing a first solid electrolyte layer for use in an all-solid battery. For example, the first solid electrolyte layer can be prepared by drying/calcining a first solid electrolyte slurry layer. For example, the first solid electrolyte slurry layer can be formed by applying a first solid electrolyte slurry.

Furthermore, the positive electrode active material layer preparation step (S1) and/or the first solid electrolyte layer preparation step (S2) may include a preliminary pressing stage for the purpose of shaping, etc., of each layer.

The positive electrode laminate production step (S3) is a step of producing a positive electrode laminate. The mode of this step is not particularly limited as long as the positive electrode laminate is pressed at a pressing pressure Pa and the pressing temperature Ta is from 150 to 175° C. For example, the positive electrode active material layer and the first solid electrolyte layer respectively prepared in steps S1 and S2 above can be pressed in this order under the conditions of a pressing pressure Pa and a pressing temperature Ta.

The second solid electrolyte layer preparation step (S4) is a step of preparing a second solid electrolyte layer. This step is not particularly limited as long as it is a step of preparing a second solid electrolyte layer for use in an all-solid battery. For example, the second solid electrolyte layer can be prepared by drying/calcining a second solid electrolyte slurry layer. For example, the second solid electrolyte slurry layer can be formed by applying a second solid electrolyte slurry.

The negative electrode active material layer preparation step (S5) is a step of preparing a negative electrode active material layer. This step is not particularly limited as long as it is a step of preparing a negative electrode active material layer for use in an all-solid battery. For example, the negative electrode active material layer can be prepared by drying/calcining a negative electrode active material slurry layer. For example, the negative electrode active material slurry layer can be formed by applying a negative electrode active material slurry.

Incidentally, the second solid electrolyte layer preparation step (S4) and/or the negative electrode active material layer preparation step (S5) may include a preliminary pressing stage for the purpose of shaping, etc., of each layer.

The negative electrode laminate production step (S6) is a step of producing a negative electrode laminate. The mode of this step is not particularly limited as long as the negative electrode laminate is pressed at a pressing pressure Pb and the pressing temperature Tb is 125° C. or less. For example, the second solid electrolyte layer and the negative electrode active material layer respectively prepared in steps S4 and S5 above can be pressed in this order under the conditions of a pressing pressure Pb and a pressing temperature Tb.

The intermediate solid electrolyte layer preparation step (S7) is a step of preparing an intermediate solid electrolyte layer. This step is not particularly limited as long as it is a step of preparing an intermediate solid electrolyte layer for use in an all-solid battery. For example, the intermediate solid electrolyte layer can be prepared by drying/calcining an intermediate solid electrolyte slurry layer. For example, the intermediate solid electrolyte slurry layer can be formed by applying an intermediate solid electrolyte slurry.

A step of stacking the intermediate solid electrolyte layer on the first (second) solid electrolyte layer side of the positive (negative) electrode laminate to preliminarily press the positive (negative) electrode laminate and the intermediate solid electrolyte layer, may be further optionally performed after positive electrode laminate production step (S3) and/or negative electrode laminate production step (S6), and before all-solid battery production step (S8).

The all-solid battery production step (S8) is a step of producing an all-solid battery. The mode of this step is not particularly limited as long as the positive electrode laminate, the intermediate solid electrolyte layer, and the negative electrode laminate can be pressed at a pressing pressure Pc.

The magnitude relation among those pressing pressure Pa, pressing pressure Pb, and pressing pressure Pc is Pa>Pc and Pb>Pc. In the case of preliminarily applying pressure to the positive (negative) electrode laminate and the intermediate solid electrolyte layer, the pressing pressure of this preliminary pressing is equal to or less than the pressing pressure Pc.

The pressing method is not particularly limited, and may be, for example, a known pressing method. The pressing method includes, for example, planar uniaxial pressing, roll pressing, and a combination thereof.

<Positive Electrode Laminate>

The positive electrode laminate has a positive electrode collector layer and a positive electrode active material layer in this order or has a positive electrode collector layer, a positive electrode active material layer, and a first solid electrolyte layer in this order.

(Positive Electrode Collector Layer)

The positive electrode collector layer is not particularly limited and includes various metals, for example, silver, copper, gold, aluminum, nickel, iron, stainless steel, and titanium; and an alloy thereof. In view of chemical stability, etc., the positive electrode collector layer is preferably a collector layer containing aluminum.

(Positive Electrode Active Material Layer)

The positive electrode active material layer contains a positive electrode active material and optionally contains an electroconductive aid, a binder, and a solid electrolyte.

The positive electrode active material includes a metal oxide containing lithium and at least one transition metal selected from manganese, cobalt, nickel, and titanium, such as lithium cobaltate ($Li_xCoO_2$) and lithium nickel cobalt manganate ($Li_{1+x}Ni_{1/3}Co_{1/3}Mn_{1/3}O_2$), and a combination thereof.

The form of the positive electrode active material is preferably a powder. The average particle diameter of the positive electrode active material is not particularly limited but from the standpoint of increasing the contact area at the solid-solid interface, it includes, for example, an average particle diameter of 1 μm or more, 3 μm or more, 5 μm or more, and 10 μm or more, and includes an average particle diameter of 100 μm or less, 50 μm or less, 30 μm or less, and 20 μm or less. The average particle diameter of the positive electrode active material is preferably an average particle diameter of 1 to 50 μm, more preferably an average particle diameter in the range from 1 to 20 μm, still more preferably an average particle diameter in the range from 1 to 10 μm, yet still more preferably an average particle diameter in the range from 1 to 6 μm.

In the present invention, unless otherwise indicated, the "average particle diameter" means an arithmetic mean value of measured values obtained by measuring the equivalent-circle diameter (Heywood diameter) of randomly selected 10 or more particles by means of a scanning transmission electron microscope (STEM), a scanning electron microscope (SEM), etc.

The positive electrode active material may optionally have a buffer film. There is a possibility that a metal sulfide having high electric resistance is produced due to occurrence of a chemical reaction between the positive electrode active material and a sulfide-based amorphous solid electrolyte and/or a sulfide-based crystalline solid electrolyte. The buffer film above has an effect of, for example, suppressing the production of metal sulfide. Due to this effect of the buffer, the output power of an all-solid battery can be enhanced.

The buffer film preferably exhibits electron insulating property and ion conductivity, and contains anion species having a strong cation-binding force. The buffer film includes, for example, $LiNbO_3$, $Li_4Ti_5O_{12}$, $Li_3PO_4$, and a combination thereof.

The thickness of the buffer film coating the positive electrode active material is not particularly limited but includes, for example, a thickness of 1 to 100 nm, a thickness in the range from 1 to 50 nm, a thickness in the range from 1 to 20 nm, and a thickness in the range from 1 to 10 nm.

The thickness of the buffer film can be measured using, for example, a transmission electron microscope (TEM).

The electroconductive aid includes a carbon material, for example, VGCF (Vapor Grown Carbon Fiber), carbon black, acetylene black (AB), Ketjen black (KB), carbon nanotube (CNT) and carbon nanofiber (CNF), a metal material, and a combination thereof.

The binder is not particularly limited but includes a polymer resin, for example, polyvinylidene fluoride (PVDF), butadiene rubber (BR), and styrene butadiene rubber (SBR), and a combination thereof.

The solid electrolyte is not particularly limited, but can use a raw material applicable as the solid electrolyte. The solid electrolyte includes a sulfide-based amorphous solid electrolyte, for example, $75Li_2S$-$25P_2S_5$; a sulfide-based crystalline solid electrolyte, for example, $Li_{3.24}P_{0.24}Ge_{0.76}S_4$; an oxide-based amorphous solid electrolyte, for example, $Li_2O$—$B_2O_3$—$P_2O_5$ and $Li_2O$—$SiO_2$; a crystalline oxide and oxynitride, for example, LiI, $Li_3N$, $Li_5La_3Ta_2O_{12}$, $Li_7La_3Zr_2O_{12}$, $Li_6BaLa_2Ta_2O_{12}$, $Li_3PO_{(4-(3/2)w)}N_w$ (w is less than 1) $Li_{3.6}Si_{0.6}P_{0.4}O_4$, $Li_{1.3}Al_{0.3}Ti_{0.7}(PO_4)_3$, and $Li_{1+x+y}A_xTi_{2-x}Si_yP_{3-y}O_{12}$ (A is Al or Ga; $0 \leq x \leq 0.4$, $0 < y \leq 0.6$); and a combination thereof. In view of exhibiting excellent lithium ion conductivity, the solid electrolyte is preferably a sulfide-based amorphous solid electrolyte and/or a sulfide-based crystalline solid electrolyte.

The form of the solid electrolyte is preferably a powder. The average particle diameter of the solid electrolyte is not particularly limited but from the standpoint of increasing the contact area at the solid-solid interface, it is preferably, for example, an average particle diameter in the range from 0.1 to 20.0 μm, more preferably an average particle diameter in the range from 0.2 to 10.0 μm, still more preferably an average particle diameter in the range from 0.3 to 6.0 μm, yet still more preferably an average particle diameter in the range from 0.5 to 3.0 μm.

(First Solid Electrolyte Layer)

The first solid electrolyte layer contains a solid electrolyte and optionally contains a binder. As for the solid electrolyte and binder of the first solid electrolyte layer, the description regarding the positive electrode active material layer may be referred to.

<Intermediate Solid Electrolyte Layer>

The intermediate solid electrolyte layer is present between the positive electrode laminate and the negative electrode laminate.

The intermediate solid electrolyte layer contains a solid electrolyte and optionally contains a binder. As for the solid electrolyte and binder of the intermediate solid electrolyte layer, the description regarding the positive electrode active material layer may be referred to.

<Negative Electrode Laminate>

The negative electrode laminate has a negative electrode active material layer and a negative electrode collector layer in this order or has a second solid electrolyte layer, a negative electrode active material layer, and a negative electrode collector layer in this order.

(Second Solid Electrolyte Layer)

The second solid electrolyte layer contains a solid electrolyte and optionally contains a binder. As for the solid electrolyte and binder of the second solid electrolyte layer, the description regarding the positive electrode active material layer may be referred to.

(Negative Electrode Active Material Layer)

The negative electrode active material contains a negative electrode active material and optionally contains an electroconductive aid, a binder, and a solid electrolyte.

The negative electrode active material is not particularly limited as long as it can store/release ion species, for example, lithium ion, but the negative electrode active material includes a metal, for example, Li, Sn, Si, and In; an alloy of lithium and titanium, magnesium, aluminum, etc.; a carbon raw material, for example, hard carbon, soft carbon, and graphite; and a combination thereof.

As for the electroconductive aid, binder, and solid electrolyte of the negative electrode active material layer, the description regarding the positive electrode active material layer may be referred to.

(Negative Electrode Collector Layer)

In view of chemical stability, etc., the negative electrode collector layer is preferably a collector layer containing copper.

<Others>

(Active Material Slurry)

The active material slurry may be a positive electrode active material slurry or a negative electrode active material slurry.

The positive electrode active material slurry contains a positive electrode active material and optionally contains a dispersion medium, an electroconductive aid, a binder, and a solid electrolyte.

The dispersion medium includes an apolar solvent, a polar solvent, and a combination thereof. The dispersion medium includes an apolar solvent, for example, heptane, xylene, and toluene; and a combination thereof. The dispersion medium includes a polar solvent, for example, a tertiary amine-based solvent, an ether-based solvent, a thiol-based solvent, and an ester-based solvent; and a combination thereof. The dispersion medium includes a tertiary amine-based solvent, for example, triethylamine; an ether-based solvent, for example, cyclopentyl methyl ether; a thiol-based solvent, for example, ethane mercaptan; an ester-based solvent, for example, butyl butyrate; and a combination thereof.

As for the positive electrode active material, electroconductive aid, binder, and solid electrolyte of the positive electrode active material slurry, the description regarding the positive electrode active material layer may be referred to.

The negative electrode active material slurry contains a negative electrode active material and optionally contains a dispersion medium, an electroconductive aid, a binder, and a solid electrolyte.

As for the negative electrode active material, electroconductive aid, binder, and solid electrolyte of the negative electrode active material slurry, the description regarding the negative electrode active material layer may be referred to. Furthermore, as for the dispersion medium of the negative electrode active material slurry, the description regarding the positive electrode active material slurry may be referred to.

(Solid Electrolyte Slurry)

The solid electrolyte slurry contains a solid electrolyte and optionally contains a dispersion medium and a binder. As for the solid electrolyte and binder of the solid electrolyte slurry, the description regarding the solid electrolyte layer may be referred to. In addition, as for the dispersion medium of the solid electrolyte slurry, the description regarding the positive electrode active material slurry may be referred to.

<<Automobile>>

The automobile is equipped with an all-solid battery manufactured by the method of the present invention.

The present invention is described in greater detail below by referring to Examples, but the scope of the present invention is of course not limited to these Examples.

EXAMPLES

Examples 1 and 2 and Comparative Example 1

Example 1

(Positive Electrode Active Material Layer Preparation Step)

A positive electrode mixture as the raw material of the positive electrode active material layer was put in a polypropylene (PP)-made vessel, stirred over a total of 150 seconds by an ultrasonic dispersion device (Model: UH-50, manufactured by SMT Corporation), and shaken over a total of 20 minutes by a shaker (Model: TTM-1, manufactured by Sibata Scientific Technology Ltd.) to prepare a positive electrode active material slurry.

This positive electrode active material slurry was applied onto an Al foil serving as a positive electrode collector layer by a blade method by means of an applicator and dried on a hot plate at 100° C. over 30 minutes to obtain a positive electrode active material layer formed on the Al foil as the positive electrode collector layer.

The configuration of the positive electrode mixture is shown below:

$LiNi_{1/3}Co_{1/3}Mn_{1/3}O_2$ (average particle diameter: 6 μm) as the positive electrode active material;
butyl butyrate as the dispersion medium;
VGCF as the electroconductive aid;
a butyl butyrate solution (5 mass %) of PVdF-based binder as the binder; and
LiI-containing $Li_2S$—$P_2S_5$-based glass ceramic (average particle diameter: 0.5 μm) as the solid electrolyte.

(Negative Electrode Active Material Layer Preparation Step)

A negative electrode mixture as the raw material of the negative electrode active material layer was put in a polypropylene (PP)-made vessel, stirred over a total of 120 seconds by an ultrasonic dispersion device (Model: UH-50, manufactured by SMT Corporation), and shaken over a total of 20 minutes by a shaker (Model: TTM-1, manufactured by Sibata Scientific Technology Ltd.) to prepare a negative electrode active material slurry.

This negative electrode active material slurry was applied onto a Cu foil serving as a collector layer by a blade method by means of an applicator and dried on a hot plate at 100° C. over 30 minutes to obtain a negative electrode active material layer formed on the Cu foil as the negative electrode collector layer.

The configuration of the negative electrode mixture is shown below:

natural graphite-based carbon (produced by Mitsubishi Chemical Corporation, average particle diameter: 10 μm) as the negative electrode active material;
butyl butyrate as the dispersion medium;
a butyl butyrate solution (5 mass %) of PVdF-based binder as the binder; and
LiI-containing $Li_2S$—$P_2S_5$-based glass ceramic (average particle diameter: 0.5 μm) as the solid electrolyte.

(Preparation Step of Each Solid Electrolyte Layer)

First and Second Solid Electrolyte Layer Preparation Steps:

An electrolyte mixture as the raw material of the first solid electrolyte layer was put in a polypropylene (PP)-made vessel, stirred over 30 seconds by an ultrasonic dispersion device (Model: UH-50, manufactured by SMT Corporation), and shaken over 30 minutes by a shaker (Model: TTM-1, manufactured by Sibata Scientific Technology Ltd.) to prepare a first solid electrolyte slurry.

This solid electrolyte slurry was applied onto an Al foil serving as a release sheet by a blade method by means of an applicator and dried on a hot plate at 100° C. over 30 minutes to obtain a first solid electrolyte layer formed on the Al foil. Furthermore, a second solid electrolyte layer formed on the Al foil was obtained by repeating the operation above.

The configuration of the electrolyte mixture is shown below:

LiI-containing $Li_2S$—$P_2S_5$-based glass ceramic (average particle diameter: 2.0 μm) as the solid electrolyte;
heptane as the dispersion medium; and
a heptane solution (5 mass %) of BR-based binder as the binder.

Intermediate Solid Electrolyte Layer Preparation Step:

An electrolyte mixture as the raw material of the intermediate solid electrolyte layer was put in a polypropylene (PP)-made vessel, stirred over 30 seconds by an ultrasonic dispersion device (Model: UH-50, manufactured by SMT Corporation), and shaken over 30 minutes by a shaker (Model: TTM-1, manufactured by Sibata Scientific Technology Ltd.) to prepare an intermediate solid electrolyte slurry.

This solid electrolyte slurry was applied onto an Al foil serving as a release sheet by a blade method by means of an applicator and dried on a hot plate at 100° C. over 30 minutes to obtain an intermediate solid electrolyte layer formed on the Al foil.

The configuration of the electrolyte mixture is shown below:

LiI-containing $Li_2S$—$P_2S_5$-based glass ceramic (average particle diameter: 1.0 μm) as the solid electrolyte;
heptane as the dispersion medium; and
a heptane solution (5 mass %) of BR-based binder as the binder.

(Positive Electrode Laminate Production Step)

The positive electrode collector layer, positive electrode active material layer, and first solid electrolyte layer prepared above were stacked in this order. The resulting laminate was set on a roll press device and pressed at 20 kN/cm (about 710 MPa) as the pressing pressure of the first pressing step (i) and at 165° C. as the pressing temperature to obtain a positive electrode laminate.

(Negative Electrode Laminate Production Step)

The second solid electrolyte layer and negative electrode active material layer prepared above, and the Cu foil as the negative electrode collector layer were stacked in this order. The resulting laminate was set on a roll press device and pressed at 20 kN/cm (about 630 MPa) as the pressing pressure of the second pressing step (ii) and at 25° C. as the pressing temperature to obtain a negative electrode laminate.

Furthermore, the Al foil as the release sheet, the intermediate solid electrolyte layer formed on the Al foil, and the negative electrode laminate prepared above having the second solid electrolyte layer, negative electrode active material layer, and Cu foil as the negative electrode collector layer were stacked in this order. The resulting laminate was set on a planar uniaxial press device and preliminarily pressed at 100 MPa and at 25° C. over 10 seconds. The Al foil was peeled off from the intermediate solid electrolyte layer of the laminate to obtain a negative electrode laminate having further stacked therein an intermediate solid electrolyte layer.

Furthermore, the negative electrode laminate and the positive electrode laminate were produced such that the area of the negative electrode laminate is larger than the area of the positive electrode laminate. The area ratio between the positive electrode laminate and the negative electrode laminate is 1.00:1.08, but as the area of the positive electrode laminate is increased, the area of the "portion where the negative electrode laminate protrudes from the periphery of the positive electrode laminate" is relatively decreased. Therefore, the area ratio is not limited to the value above.

Furthermore, the difference between the pressing pressure of 20 kN/cm (about 710 MPa) of the first pressing step (i) and the pressing pressure of 20 kN/cm (about 630 MPa) of the second pressing step (ii) is caused by the difference in the area between the positive electrode laminate and the negative electrode laminate. That is, the effective pressure (MPa) may be correlated, in an inversely proportional manner, to the contact area between the roll of the roll press device and the laminate. Accordingly, when the contact area between the roll and the positive electrode laminate is relatively small, the effective pressure in applying pressure to the positive electrode laminate becomes relatively large.

(All-Solid Battery Production Step)

The positive electrode laminate and the negative electrode laminate having further stacked therein the intermediate solid electrolyte layer were stacked in this order. The resulting laminate was set on a planar uniaxial press device and pressed at 200 MPa as the pressing pressure and at pressing temperature of 120° C. of the third pressing step (iii), over 1 minute. An all-solid battery was thereby obtained.

Example 2

The all-solid battery of Example 2 was produced in the same manner as in Example 1 other than the pressing pressure of the third pressing step (iii) was set to 100 MPa.

Comparative Example 1

The all-solid battery of Comparative Example 1 was produced in the same manner as in Example 1 other than all of the pressing pressures of the first pressing step (i), the second pressing step (ii), and the third pressing step (iii) were set to 600 MPa.

<<Evaluation>>

With respect to the all-solid batteries of Examples 1 and 2 and Comparative Example 1, the filling factor of each layer, the occurrence or no occurrence of a short circuit, and the internal resistance value of the all-solid battery were evaluated. The conditions in the manufacturing process of the all-solid battery, the occurrence or no occurrence of a short circuit, and the internal resistance value (relative value) of the all-solid battery in each Example are shown in Table 1 below.

TABLE 1

|  | Example 1 | Example 2 | Comparative Example 1 |
| --- | --- | --- | --- |
| Pressing pressure of positive electrode laminate (MPa) | 710 | 710 | 600 |
| Pressing pressure of negative electrode laminate (MPa) | 630 | 630 | 600 |
| Pressing pressure of all-solid battery (MPa) | 200 | 100 | 600 |
| Pressing temperature of positive electrode laminate (° C.) | 165 | 165 | 165 |
| Pressing temperature of negative electrode laminate (° C.) | 25 | 25 | 25 |
| Pressing temperature of all-solid battery (° C.) | 120 | 120 | 120 |
| Filling factor of first solid electrolyte layer (%) | 91 | 91 | 90 |
| Filling factor of second solid electrolyte layer (%) | 90 | 90 | 90 |
| Filling factor of intermediate solid electrolyte layer (%) | 85 | 79 | 91 |
| Occurrence or no occurrence of short circuit | no | no | occurrence |
| Internal resistance value (relative value) of all-solid battery (%) | 100 | 102 | — |

In Table 1, the internal resistance value (relative value) of all-solid battery is a relative value when the internal resistance value of the all-solid battery of Example 1 is taken as 100%.

The method for measuring the internal resistance value of the all-solid battery is as follows:
the all-solid battery is charged to a predetermined voltage;
7 C discharge is performed from the predetermined voltage over a predetermined time; and
the internal resistance value of the all-solid battery is calculated from the voltage drop and the current at the time of 7 C discharge.

The "C" in the 7 C discharge above means a discharge rate. The discharge rate is an indicator in which "1 C" value is equal to a value of a constant-current such that a battery having a capacity of a nominal capacity value is completely discharged at 1 hour and under the constant-current. For example, a constant-current value under which discharge completes in 5 hours is denoted by "0.2 C", and a constant-current value under which discharge completes in 10 hours is denoted by "0.1 C".

It is seen from Table 1 that in the all-solid battery of Comparative Example 1 where the pressing pressures of first, second, and third pressing step (iii) are 600 MPa, a short circuit was generated at the time of manufacture. This is believed to be due to the fact that because the positive electrode laminate having a small area bites into the negative electrode laminate having a large area and the positive electrode active material layer and the negative electrode active material layer were electrically conducted and short-circuited.

In addition, it is seen from Table 1 that the internal resistance value (measured value) of the all-solid battery of Example 1 was slightly lower than the internal resistance value (relative value) of the all-solid battery of Example 2. This is believed to be due to the fact that because in the pressing pressure of the third pressing step (iii), the pressing pressure of Example 1 was higher than the pressing pressure of Example 2 by 100 MPa, whereby a difference was generated in the filling factor of the intermediate solid electrolyte layer.

Examples 3 to 5 and Comparative Examples 2 to 6

The all-solid batteries of Examples 3 to 5 and Comparative Examples 2 to 6 were produced in the same manner, in terms of the production conditions, as the all-solid battery of Example 1 other than the pressing temperature of the first pressing step (i) was changed as shown in Table 2 below.
<<Evaluation>>
The internal resistance value of the all-solid batteries of Examples 3 to 5 and Comparative Examples 2 to 6 were evaluated. The results are shown in Table 2 and FIG. 2.

TABLE 2

|  | Comparative Example 2 | Comparative Example 3 | Comparative Example 4 | Comparative Example 5 | Example 3 | Example 4 | Example 5 | Comparative Example 6 |
|---|---|---|---|---|---|---|---|---|
| Pressing temperature of positive electrode laminate (° C.) | 25 | 75 | 100 | 125 | 150 | 165 | 175 | 200 |
| Internal resistance value (relative value) of all-solid battery (%) | 100.0 | 94.1 | 92.7 | 86.3 | 84.9 | 82.0 | 85.2 | 89.0 |

As for the measuring method of the internal resistance value of the all-solid battery, please refer to the explanation for Table 1.

Figure 2:
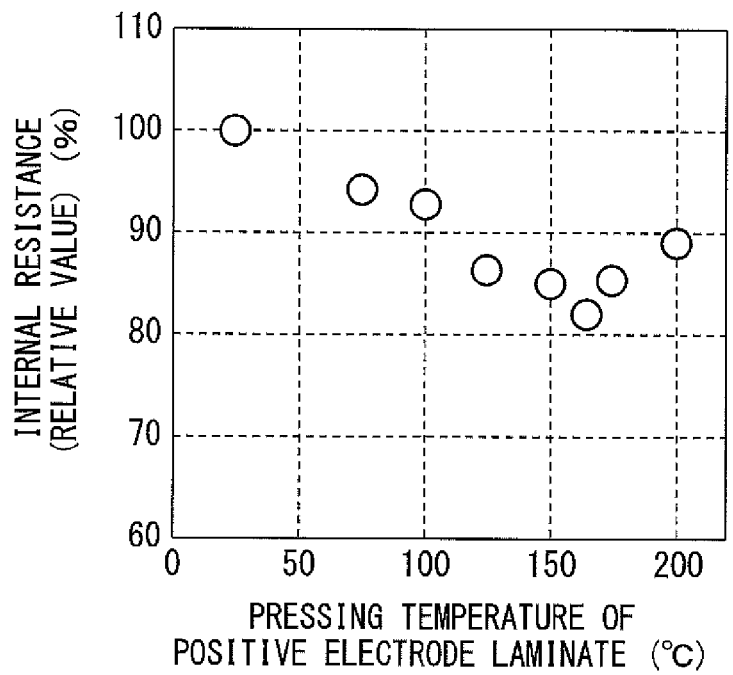
FIG. 2 is a view illustrating the relationship between the pressing temperature (° C.) of the positive electrode laminate and the internal resistance value (relative value) (%) of an all-solid battery, regarding the all-solid battery having stacked therein a positive electrode laminate, an intermediate solid electrolyte layer, and a negative electrode laminate.

FIG. 2 is a view illustrating the relationship between the pressing temperature (° C.) of the positive electrode laminate and the internal resistance value (relative value) (%) of the all-solid battery, regarding an all-solid battery having stacked therein a positive electrode laminate, an intermediate solid electrolyte layer, and a negative electrode laminate.

In FIG. 2, the internal resistance value (relative value) of the all-solid battery is a relative value when the internal resistance value of the all-solid battery of Comparative Example 2 in which the pressing temperature of the positive electrode laminate was 25° C. is taken as 100%. It is seen from FIG. 2 that in Examples 3 to 5 where the pressing temperature of the positive electrode laminate was from 150 to 175° C., the internal resistance value (relative value) of the all-solid battery was reduced. Accordingly, it is understood that in the temperature range above, the internal resistance value of the all-solid battery is reduced and the performance of the battery is enhanced.

This is believed to be achieved for the following reasons:
the solid electrolyte is softened by the pressing at 100° C. or more, particularly 150° C. or more, as a result, the contact property and/or the contact area between the solid electrolyte and the solid electrolyte and/or between the solid electrolyte and the positive electrode active material are enhanced, and furthermore, the filling factor of the positive electrode laminate, in particular, the positive electrode active material layer, is increased; and
due to the pressing at 175° C. or less, the solid electrolyte, in particular, the sulfide-based solid electrolyte, is prevented from undergoing a change in the crystal structure, whereby formation of a low lithium ion conductive layer is suppressed.

Examples 6 to 8 and Comparative Examples 7 and 8

The all-solid batteries of Examples 6 to 8 and Comparative Examples 7 and 8 were produced in the same manner as the all-solid battery of Example 1 other than the pressing temperature of the second pressing step (ii) was changed as shown in Table 3 below.

<<Evaluation>>
The all-solid batteries of Examples 6 to 8 and Comparative Example 7 and 8 were evaluated for the charge/discharge efficiency. The results are shown in Table 3 and FIG. 3.

TABLE 3

|  | Example 6 | Example 7 | Example 8 | Comparative Example 7 | Comparative Example 8 |
|---|---|---|---|---|---|
| Pressing temperature of negative electrode laminate (° C.) | 25 | 100 | 125 | 150 | 200 |
| Charge/discharge efficiency (relative value) of all-solid battery (%) | 100 | 100.1 | 100.4 | 98.8 | 97.9 |

The measuring method of the charge/discharge efficiency of the all-solid battery is as follows:
a charge capacity at the time of first subjecting the all-solid battery to constant-current constant-voltage charge (CCCV) is measured;
a discharge capacity at the time of first subjecting the all-solid battery to constant-current constant-voltage charge (CCCV) is measured; and
the discharge capacity is divided by the charge capacity.

Figure 3:
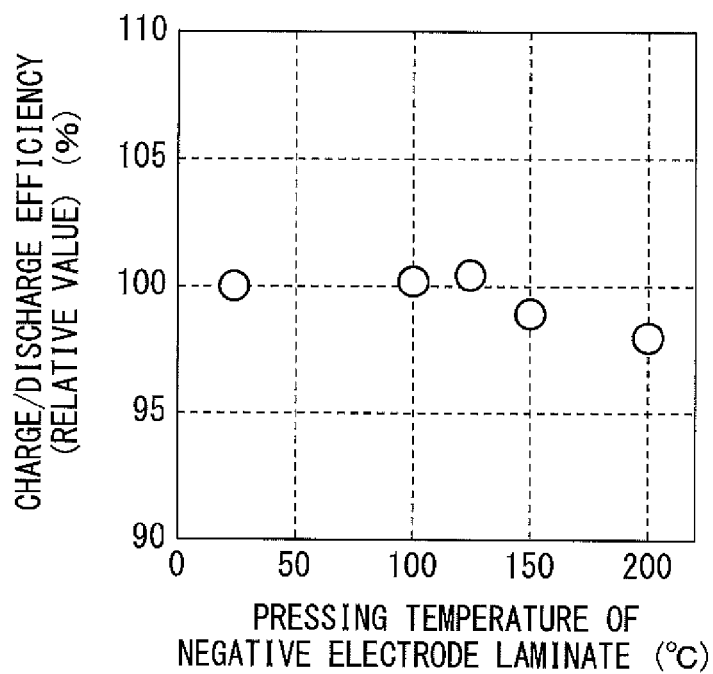
FIG. 3 is a view illustrating the relationship between the pressing temperature (° C.) of the negative electrode laminate and the charge/discharge efficiency (relative value) (%) of the all-solid battery, regarding an all-solid battery having stacked therein a positive electrode laminate, an intermediate solid electrolyte layer, and a negative electrode laminate.
Figure 4:
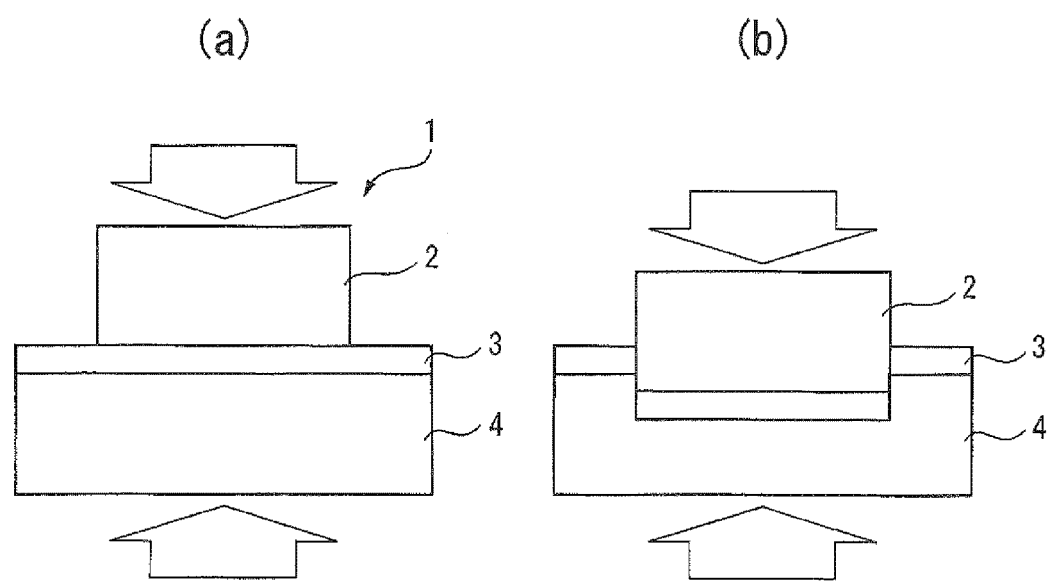
FIG. 4 is a view illustrating how the negative electrode laminate is broken when a pressure is applied to a laminate having stacked therein a positive electrode laminate of small area and a negative electrode laminate of large area in the manufacturing process of a conventional all-solid battery.

FIG. 3 is a view illustrating the relationship between the pressing temperature (° C.) of the negative electrode laminate and the charge/discharge efficiency (relative value) (%) of the all-solid battery, regarding an all-solid battery having stacked therein a positive electrode laminate, an intermediate solid electrolyte layer, and a negative electrode laminate.

In FIG. 3, the charge/discharge efficiency (relative value) of the all-solid battery is a relative value when the charge/discharge efficiency of the all-solid battery of Example 6 in which the pressing temperature of the negative electrode laminate was 25° C. is taken as 100%. It is seen from FIG. 3 that in Examples 6 to 8 where the pressing temperature of the negative electrode laminate was 125° C. or less, reduction in the charge/discharge efficiency (relative value) of the all-solid battery was suppressed.

This is believed to be achieved because in the negative electrode laminate having a Cu foil as the negative electrode collector layer and a negative electrode active material layer containing $Li_2S$—$P_2S_5$-based glass ceramic as the sulfide-based solid electrolyte, the production of copper sulfide, etc., can be suppressed due to the pressing at 125° C. or less.

Incidentally, in the case of producing an all-solid battery after applying pressure to the negative electrode laminate at the pressing temperature shown in Table 3, the all-solid battery was pressed at a pressing temperature of 120° C., and this operation was performed for the purpose of suppressing the production of copper sulfide, etc., at 125° C. or less and at the same time, softening the solid electrolyte to enhance the contact at the solid-solid interface between particles.

Examples 9 to 11 and Comparative Example 9

The all-solid batteries of Examples 9 to 11 and Comparative Example 9 were produced in the same manner as the all-solid battery of Example 1 other than the pressing temperature of the third pressing step (iii) was changed as shown in Table 4 below.

<<Evaluation>>

The all-solid batteries of Examples 9 to 11 and Comparative Example 9 were evaluated for the filling factor and resistance value of the intermediate solid electrolyte layer; and for the internal resistance value of the all-solid battery. The results are shown in Table 4 below.

TABLE 4

|  | Example 9 | Example 10 | Example 11 | Comparative Example 9 |
|---|---|---|---|---|
| Pressing pressure of all-solid battery (MPa) | 40 | 100 | 200 | 400 |
| Filling factor of intermediate solid electrolyte layer (%) | 61 | 73 | 84 | 91 |
| Resistance value (relative value) of intermediate solid electrolyte layer (%) | 268 | 162 | 100 | 85 |
| Internal resistance value (relative value) of all-solid battery (%) | 102 | 101 | 100 | 100 |

In Table 4, the resistance value (relative value) of intermediate solid electrolyte layer is a relative value when the resistance value of the intermediate solid electrolyte layer of Example 11 in which the filling factor was 84% is taken as 100%. The resistance value of the intermediate solid electrolyte layer was measured by an alternating-current impedance method. This resistance value specifically corresponds to the lithium ion conductivity. In the measurement, Solartron 1260 (manufactured by Solartron) was used, the measurement conditions were an applied voltage of 5 mV and a measurement frequency range of 0.01 to 1 MHz, and a resistance value at 100 kHz was measured.

As for the measuring method of the internal resistance value of the all-solid battery, please refer to the explanation for Table 1.

It is seen from Table 4 that as the value of the filling factor of the intermediate solid electrolyte is larger, the resistance value (relative value) of the intermediate solid electrolyte layer is decreased. Accordingly, it is understood that when the filling factor is relatively low, the resistance value is relatively high.

Furthermore, it is seen from Table 4 that when the resistance value (relative value) of the intermediate solid electrolyte was 100%, 162%, and 268%, the internal resistance value (relative value) of the all-solid battery was 100%, 101%, and 102%, respectively. Accordingly, it is understood that when the resistance value (relative value) of the intermediate solid electrolyte is increased by two times or more, the increase in the internal resistance value (relative value) of the all-solid battery is 2%. In other words, it is understood that the increase in the resistance value of the intermediate solid electrolyte layer does not substantially effect on the internal resistance value of the all-solid battery.

This is believed to be due to the fact that with respect to the internal resistance value of the all-solid battery, the effect of the resistance value of the intermediate solid electrolyte layer is very small.

Example 12 and Comparative Examples 10 and 11

The all-solid batteries of Example 12 and Comparative Examples 10 and 11 were produced in the same manner as the all-solid battery of Example 1 other than heating or no heating of the positive electrode laminate, and presence or no presence of the intermediate solid electrolyte layer were changed as shown in Table 5 below.

<<Evaluation>>

With respect to the all-solid batteries of Example 12 and Comparative Examples 10 and 11, the bonding of the positive electrode laminate and the negative electrode laminate, and the internal resistance value of the all-solid battery were evaluated. The results are shown in Table 5 below.

TABLE 5

|  | Example 12 | Comparative Example 10 | Comparative Example 11 |
|---|---|---|---|
| Heating of positive electrode laminate | heated | heated | none |
| Heating of negative electrode laminate | none | none | none |
| Presence of intermediate solid electrolyte | present | none | none |
| Bonding of positive electrode laminate and negative electrode laminate | good | non-bondable | good |
| High or low of internal resistance value of all-solid battery | low | non-measurable | high |

The bonding was evaluated by the checking with an eye after the third pressing. In the battery of defective bonding, the positive electrode laminate and/or the negative electrode laminate were bent and separated just after the release of pressing pressure. As for the measuring method of the internal resistance value of the all-solid battery, please refer to the explanation for Table 1.

It is seen from Table 5 that in Comparative Example 10, the bonding of the positive electrode laminate and the negative electrode laminate of the all-solid battery was defective and it was impossible to manufacture an all-solid battery. This is believed to be due to the fact that because of press-heating of the positive electrode laminate at 165° C., the contact surface on the positive electrode laminate side between the positive electrode laminate and the negative electrode laminate was smoothed, whereby the bonding and/or adhesion therebetween were reduced.

On the other hand, in the all-solid battery of Example 12, the bonding and/or adhesion were enhanced. This is believed to be due to the fact that because an intermediate solid electrolyte in a non-compressed state was present between the positive electrode laminate and the negative electrode laminate at the time of pressing in the third pressing step (iii), an anchor effect, etc., was easily exhibited, as a result, the bonding and/or adhesion were enhanced. In addition, also note that in the all-solid battery of Example 12, by the enhancement of bonding and/or adhesion, the internal resistance value (relative value) of the all-solid battery was improved, compared with the all-solid battery of Comparative Example 11.

While the preferred embodiments of the present invention are described in detail, it will be understood by one skilled in the art that the devices or chemicals, the manufacturers and grades thereof, the positions and arrangements of the production line, etc., which are employed in the method of the present invention, can be changed within the scope of claims.

DESCRIPTION OF NUMERICAL REFERENCES

1 Laminate
2 Positive electrode laminate
3 Solid electrolyte layer
4 Negative electrode laminate

What is claimed is:

1. A method for manufacturing an all-solid battery having stacked therein, in order, a positive electrode laminate, an intermediate solid electrolyte layer, and a negative electrode laminate, comprising:
    (i) applying pressure to the positive electrode laminate,
    (ii) applying pressure to the negative electrode laminate, and
    (iii) applying pressure to the positive electrode laminate, the intermediate solid electrolyte layer, and the negative electrode laminate, wherein:
    the pressing pressure of the step (i) is higher than the pressing pressure of the step (iii), and
    the pressing temperature of the step (i) is from 150 to 175° C.;
    the pressing pressure of the step (ii) is higher than the pressing pressure of the step (iii), and the pressing temperature of the step (ii) is 125° C. or less;
    the pressing temperature of the step (iii) is 125° C. or less;
    the positive electrode laminate has a positive electrode collector layer and a positive electrode active material layer in this order or has a positive electrode collector layer, a positive electrode active material layer and a first solid electrolyte layer in this order;
    the negative electrode laminate has a negative electrode active material layer and a copper-containing negative electrode collector layer in this order or has a second solid electrolyte layer, a negative electrode active material layer, and a copper-containing negative electrode collector layer in this order;
    at least one of the first solid electrolyte layer and the second solid electrolyte layer is present; and
    the intermediate solid electrolyte layer before the pressing in the step (iii) is not pressed at a pressure exceeding the pressing pressure of the step (iii).

2. The method according to claim 1, wherein the pressing pressure of the step (i) is 710 MPa or more.

3. The method according to claim 1, wherein the pressing pressure of the step (ii) is 630 MPa or more.

4. The method according to claim 1, wherein the pressing pressure of the step (iii) is 200 MPa or less.

5. The method according to claim 1, wherein the area of the positive electrode laminate is smaller or larger than the area of the negative electrode laminate.

6. The method according to claim 1, wherein:
    the first solid electrolyte layer and/or the second solid electrolyte layer contain a sulfide-based crystalline solid electrolyte; and
    the intermediate solid electrolyte layer contains a sulfide-based amorphous solid electrolyte.

7. The method according to claim 1, wherein the positive electrode collector layer contains aluminum.

8. The method according to claim 2, wherein the pressing pressure of the step (ii) is 630 MPa or more.

9. The method according to claim 2, wherein the pressing pressure of the step (iii) is 200 MPa or less.

10. The method according to claim 3, wherein the pressing pressure of the step (iii) is 200 MPa or less.

11. The method according to claim 8, wherein the pressing pressure of the step (iii) is 200 MPa or less.

12. The method according to claim 2, wherein the area of the positive electrode laminate is smaller or larger than the area of the negative electrode laminate.

13. The method according to claim 3, wherein the area of the positive electrode laminate is smaller or larger than the area of the negative electrode laminate.

14. The method according to claim 4, wherein the area of the positive electrode laminate is smaller or larger than the area of the negative electrode laminate.

15. The method according to claim 8, wherein the area of the positive electrode laminate is smaller or larger than the area of the negative electrode laminate.

16. The method according to claim 9, wherein the area of the positive electrode laminate is smaller or larger than the area of the negative electrode laminate.

17. The method according to claim 10, wherein the area of the positive electrode laminate is smaller or larger than the area of the negative electrode laminate.

18. The method according to claim 11, wherein the area of the positive electrode laminate is smaller or larger than the area of the negative electrode laminate.

19. The method according to claim 2, wherein:
    the first solid electrolyte layer and/or the second solid electrolyte layer contain a sulfide-based crystalline solid electrolyte; and
    the intermediate solid electrolyte layer contains a sulfide-based amorphous solid electrolyte.

* * * * *